United States Patent [19]

Abuyama

[11] Patent Number: 4,674,862
[45] Date of Patent: Jun. 23, 1987

[54] IMAGE-FORMING APPARATUS WITH A DOCUMENT-FEEDING DEVICE

[75] Inventor: Yasuo Abuyama, Ebina, Japan

[73] Assignee: Kabushiki Kaisha Toshiba, Kawasaki, Japan

[21] Appl. No.: 671,246

[22] Filed: Nov. 14, 1984

[30] Foreign Application Priority Data

Nov. 28, 1983 [JP] Japan .................................. 58-223574

[51] Int. Cl.⁴ ........................................... G03G 15/00
[52] U.S. Cl. .............................. 355/14 SH; 353/3 SH; 353/14 R
[58] Field of Search ............. 355/14 SH, 3 SH, 14 R, 355/14 C, 75

[56] References Cited

U.S. PATENT DOCUMENTS

| | | | |
|---|---|---|---|
| 3,945,728 | 3/1976 | Crandell | 355/14 R |
| 4,372,673 | 2/1983 | Tomosada et al. | 355/75 |
| 4,421,404 | 12/1983 | Conly | 355/14 SH X |
| 4,433,909 | 2/1984 | Goes in Center et al. | 355/14 SH X |
| 4,523,752 | 6/1985 | Kigawa et al. | 355/14 SH X |

Primary Examiner—A. C. Prescott
Attorney, Agent, or Firm—Cushman, Darby & Cushman

[57] ABSTRACT

A copying apparatus which prevents a document manually placed on the document-support plate from being damaged by the subsequent automatic feeding of other documents to the document-support plate. The apparatus includes a document feeder for feeding the automatically-fed documents to a copying position on the document-support plate. The document feeder is rotatable between a first position where it is adjacent the document-support plate, and a second position where it is not adjacent the document-support plate. Control means are provided for preventing the document feeder from providing an automatically-fed document to the copying position when the last copying operation was performed on a manually positioned document. The controller includes a flag memory which stores a first signal when a manually positioned document has been copied, and a second signal when an automatically-fed document has been copied. The document feeder is prevented from feeding documents so long as the first signal is stored in the flag memory.

6 Claims, 5 Drawing Figures

IMAGE-FORMING APPARATUS WITH A DOCUMENT-FEEDING DEVICE

BACKGROUND OF THE INVENTION

This invention relates to an image-forming apparatus and more particularly to an image-forming apparatus fitted with a document-feeding device which is designed to automatically place on a prescribed spot of a document-supporting plate a document whose image is to be formed.

A copying apparatus may be described as an image-forming apparatus which reads information on a document and records the information on a recording medium as an image. A copying apparatus fitted with a document-feeding device comprises a document-supporting plate for holding a document whose image is to be formed at a prescribed spot on the table, and a document-feeding device which is designed to automatically transport a received document to the prescribed spot. Such a document-feeding device can successively transport a plurality of documents supplied thereto to the prescribed spot and drawout successively the copied documents and therefore the feeding device is useful in copying a large number of documents at a high speed. When, however, copying an extremely thin and easily breakable document or a specified page from, for example, a book, the conventional practice is to manually set the thin document or page at the prescribed spot on the document-supporting plate. With the conventional copying apparatus arranged as described above, sometimes the extremely thin and easily breakable document is manually set on the prescribed spot and then a new document is fed to the prescribed spot by the document-feeding device without removing the manually set document. In such case, the conventional copying apparatus is accompanied with the drawbacks that while the preceding manually set document still remains on a prescribed position of the document-supporting plate, a succeeding document is brought to the same prescribed spot by means of the feeding device. Consequently, both documents are damaged by their collision. Such document damage should be prevented by any means possible.

SUMMARY OF THE INVENTION

It is accordingly the object of this invention to provide an image-forming apparatus for forming an image of a document either manually set or supplied by a feeding device which particularly prevents damage to a manually set document.

An image-forming apparatus fitted with a document-feeding device according to the present invention comprises document-supporting means for holding at a prescribed spot thereof a document bearing an image to be formed on a recording medium; a document-feeding device for transporting a document to the prescribed spot in cooperation with the document-supporting means, the document-feeding device being capable of being shifted between a first position in which the document-supporting means cooperates with the document-feeding device and a second position in which the document-supporting means does not cooperate with the document-feeding device; first means for forming on the recording medium the image of a document transported to the prescribed spot by the document-feeding device in cooperation with the document-supporting means; second means for forming on the recording medium the image of a document manually set at the prescribed spot of the document-supporting means; detection means for issuing a detection signal denoting that the document-feeding device is shifted from the first position to the second position; memory means for storing a signal denoting that an image-forming operation was carried out by the second means in the latest image-forming process; and means which, upon receipt of the signal stored in the memory means, prevents an image-forming operation by the first means succeeding the latest image-forming process carried out by the second means, so long as the detection means does not issue the detection signal.

DETAILED DESCRIPTION OF THE PREFERRED EMBODIMENT

Figure 1:
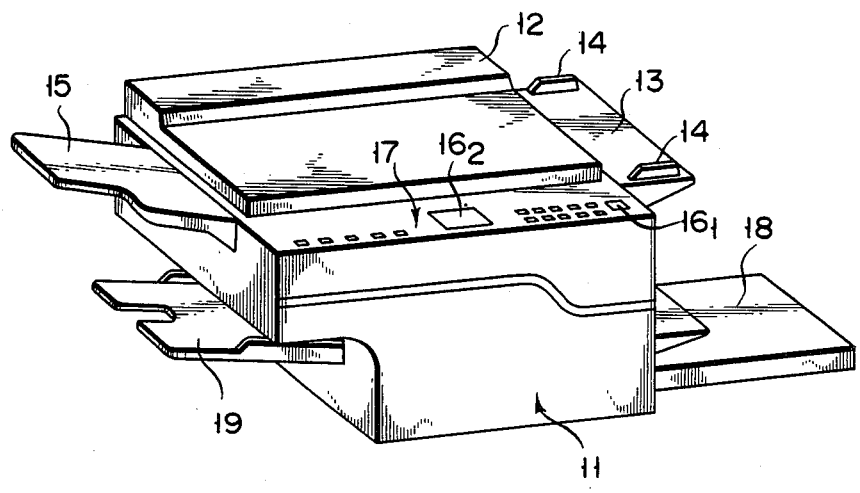
FIG. 1 is an external oblique view of a copying apparatus embodying this invention.

Referring to FIG. 1, a freely movable cover 12 is mounted on a main frame 11. A document-feeding board 13 is provided on the outside of that portion of the main frame 11 which faces the indicated right side of the cover 12. The document-feeding board 13 is fitted with a pair of document-guiding projections 14. A document takeout tray 15 is provided on the outside of that portion of the main frame 11 which faces the indicated left side of the cover 12. A control panel 17 is provided on that portion of the surface of the main frame 11 which faces the front side of the cover 12. A copy key $16_1$ and display section $16_2$ are set on the control panel 17. A copy-sheet feeding cassette 18 containing copy sheets is projectively fitted to the indicated right side of the main frame 11. An image-bearing copy sheet takeout tray 19 is projectively provided on the indicated left side of the main frame 11 below the document takeout tray 15.

Figure 2:
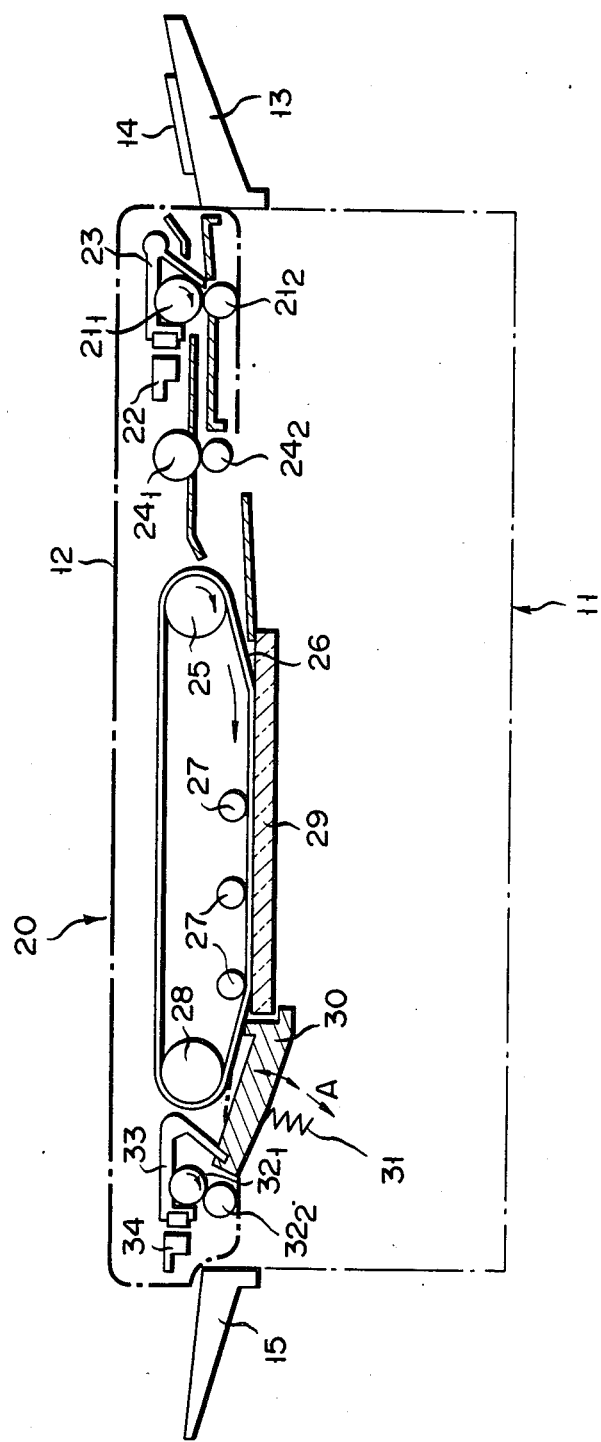
FIG. 2 is a lateral sectional view of a document-feeding device involved in the copying apparatus of FIG. 1.

The document-feeding device 20 shown in FIG. 2 is received in the cover 12. The construction of the document-feeding device when the cover is closed is shown in FIG. 2. The document-feeding device 20 includes document-feeding rollers $21_1$, $21_2$, an inlet switch 41 (FIG. 3) including a lead switch 22 and a document-detecting actuator 23, document aligning rollers $24_1$, $24_2$, a bolt roller 25, a driven roller 28, a belt 26 stretched between the rollers 25, 28, a press roller 27 for pressing the belt 26 against a document-supporting plate 29 made of transparent glass when the cover 12 takes the position shown in FIG. 1, a stopper 30, a solenoid 47 (FIG. 3) for driving the stopper 30 in the direction indicated by an arrow A against the urging force of a spring 31, a lead switch 34 and taken-out document-detecting actuator 33 jointly constituting an outlet switch 48 (FIG. 3), document takeout rollers $32_1$, $32_2$, a document-feeding motor 44, a device 43 for controlling the positive and negative rotations of the document-feeding motor 44, and a switch 49 (FIG. 4) for detecting the position of the document-feeding device 20.

Figure 3:
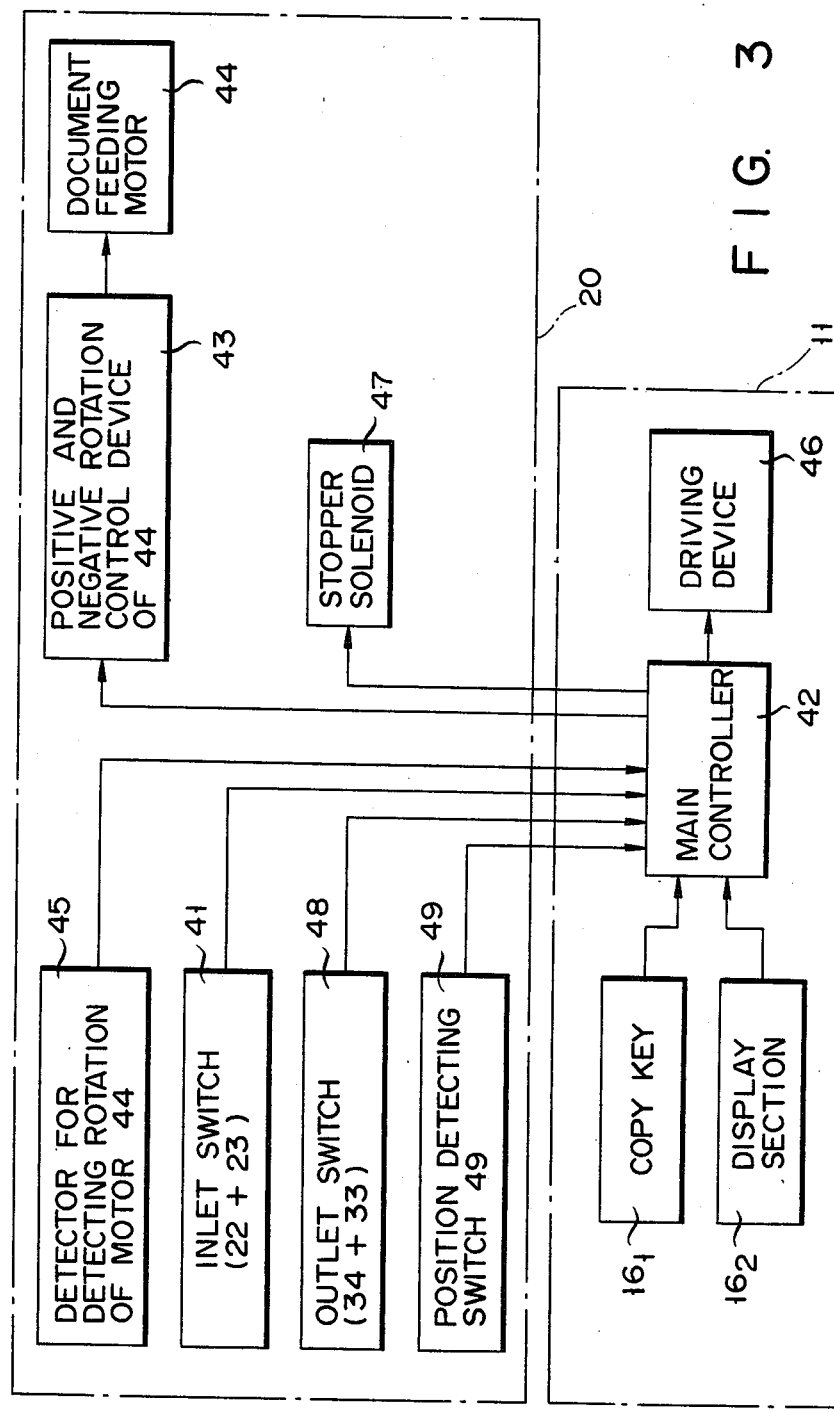
FIG. 3 is a block circuit diagram showing the operational relationship between the main control section of the copying apparatus of FIG. 1 and the control section of the document-feeding device of FIG. 2.

The main frame 11 holds the main controller 42 of the copying apparatus shown in FIG. 1, and the driving device 46 which drives the prescribed sections of the copying apparatus in accordance with the contents of a control signal issued from the main controller 42. The control means of the document-feeding device 20, for example, a copy key $16_1$ and display section $16_2$ are connected to the main controller 42. This main controller 42 is further connected, as shown in FIG. 3, to the inlet switch 41, outlet switch 48, the switch 49 for detecting the position of the document-feeding device 20, the detector 45 for detecting the amount of rotation of the motor 44, the device 43 for controlling the positive and negative rotation of the motor 44, and the stopper solenoid 47.

When a document is supplied to the document-feeding board 13 (shown in FIG. 2), it is carried by the document-guiding projections 14. As a result, one end of the document is pressed against the feeding rollers $21_1$, $21_2$. The inlet switch 41 (including the lead switch 22 and actuator 23) detects the arrival of the document. After receiving an output signal from the inlet switch 41, the main controller 42 is ready for the copying operation. Upon completing this preparatory operation, the main controller 42 issues a negative rotation signal to the device 43 for rotating the document-feeding motor in the negative direction. This document-feeding motor 44 acts as the main driving motor of the document-feeding device 20, and is coupled to the feeding rollers $21_1$, $21_2$, aligning rollers $24_1$, $24_2$ and belt roller 25 by means of a gear and a one-way clutch (neither shown). When the feeding motor 44 makes a negative rotation, the feeding rollers $21_1$, $21_2$ alone are rotated. When the feeding motor 44 makes a positive rotation, the aligning rollers $24_1$, $24_2$ and belt roller 25 are driven. The motor rotating amount detector 45 detects the rotating amount of the document-feeding motor 44 in the form of a pulse number, and supplies the pulse number to the main controller 42.

Because the feeding rollers $21_1$, $21_2$ are rotated when the document-feeding motor 44 makes a negative rotation, the forward portion of the document is moved to the aligning rollers $24_1$, $24_2$. The main controller 42 counts the number of pulses supplied from the motor rotating amount detector 45. When the counted pulse number reaches a prescribed level, the main controller 42 issues a control signal to the device 43 to control the positive and negative rotations of the document-feeding motor 44, thereby stopping its negative rotation. Upon the lapse of a prescribed length of time, the motor 44 is changed to a positive rotation. At this time, the aligning rollers $24_1$, $24_2$ and belt roller 25 start rotating. Upon the rotation of the belt roller 25, the belt 26, the belt-pressing roller 27 and the driven roller 28 are rotated, causing the document to be transported to the document-supporting table 29. When the forward end of the document is pressed against the stopper 30, the document stops at a prescribed spot on the document-supporting plate 29. When the document-feeding motor 44 makes a positive rotation of a prescribed amount, the main controller 42 issues a signal to the positive and negative rotation control device 43 to stop the document-feeding motor 44. As a result, the document is set at a predetermined spot on the document-supporting plate 29. After the document is set, the main controller 42 causes the image on the document to be impressed on a copy sheet delivered from the copy-sheet feeding cassette 18 by means of the driving device 46 under the first mode operation (a first image-forming means). When the copying operation is brought to an end, the document withdrawing operation is commenced. First, the stopper solenoid 47 is driven by the main controller 42. The stopper solenoid 47 drives the stopper 30 in the direction of arrow A shown in FIG. 2 against the urging force of the spring 31. Since, at this time, the document-feeding motor 44 makes a positive rotation, the belt 26 is driven by means of the belt roller 25. The driven belt roller 28 is coupled to the document takeout rollers $32_1$, $32_2$ by means of a belt (not shown). When, therefore, the document takeout rollers $32_1$, $32_2$ are rotated as a result of the rotation of the driven belt roller 28, the document is drawn out to the takeout tray 15. When the document-feeding motor 44 is rotated at a prescribed amount, the stopper solenoid 47 is deenergized, to return the stopper 30 to the indicated original position. When the document-feeding motor 44 makes a positive rotation by a prescribed amount after the return of the stopper 30, the removal of the document is brought to an end, and the document-feeding motor 44 stops its rotation. The outlet switch 48 (including the lead switch 34 and the actuator 33) is used to detect the presence of the document. Namely, it detects at a prescribed timing whether the document has passed through the outlet switch 48.

Each time a document is supplied to the document-feeding device 20, when it takes the position as shown in FIG. 2, from the document-feeding board 13, the image of the document is formed. In this case, it is unnecessary to push the copy key $16_1$. When, however, a particular page of a thick book is copied, the page must be manually set at the specified spot on a document-supporting plate 29. Thereafter, the copy key $16_1$ is pushed to copy the particular page. An extremely thin document must also be manually set on the document-supporting plate 29. After the document-feeding device 20 is set as shown in FIG. 2, the copy key $16_1$ is pushed to copy the thin document. When a document having an ordinary thickness is copied without applying the document-feeding device 20, the copying operation is carried out in the same manner as when the above-mentioned thin document is copied.

It sometimes happens that, without removing a document manually set on the document-supporting plate 29, the document-feeding device 20 is brought to the position as shown in FIG. 2 and the document is supplied from the document-feeding board 13. In such a case, the aforementioned drawback can take place that the manually set document on the document-supporting plate 29 and the document fed by the document-feeding device 20 collide and so are damaged. This invention is intended to eliminate this type of damage to the documents.

Figure 4:
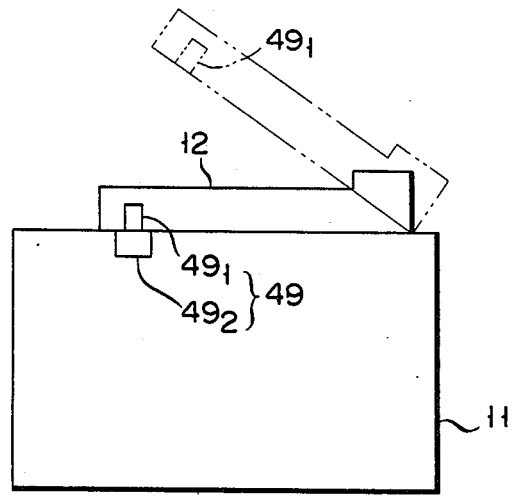
FIG. 4 illustrates a mechanism for detecting the position of the document-feeding device of FIG. 2.

The main controller 42 comprises a microcomputer which includes a flag memory designed to generate various control flags in the memory (RAM) of the microcomputer. The flag memory involved in the copying apparatus embodying this invention produces an A flag. As used herein, an operation for copying a document automatically placed on the document-supporting plate 29 by the document-feeding device 20 is designated as a first mode operation (first image-forming means). An operation for copying a document manually set on the document-supporting plate 29 is referred to as a second mode operation (second image-forming means). When the latest copying operation represents the first mode operation (image-forming operation for an automatically placed document), then the A flag is set at binary code 0. When the latest copying operation denotes the second mode operation (image-forming operation for a manually set document), then the A flag is set at binary code 1. When, however, the cover 12 is opened as shown in FIG. 4 to take the position of the broken line, the position-detecting switch 49 is rendered nonconducting, causing the A flag to be reset at binary code 0.

Figure 5:
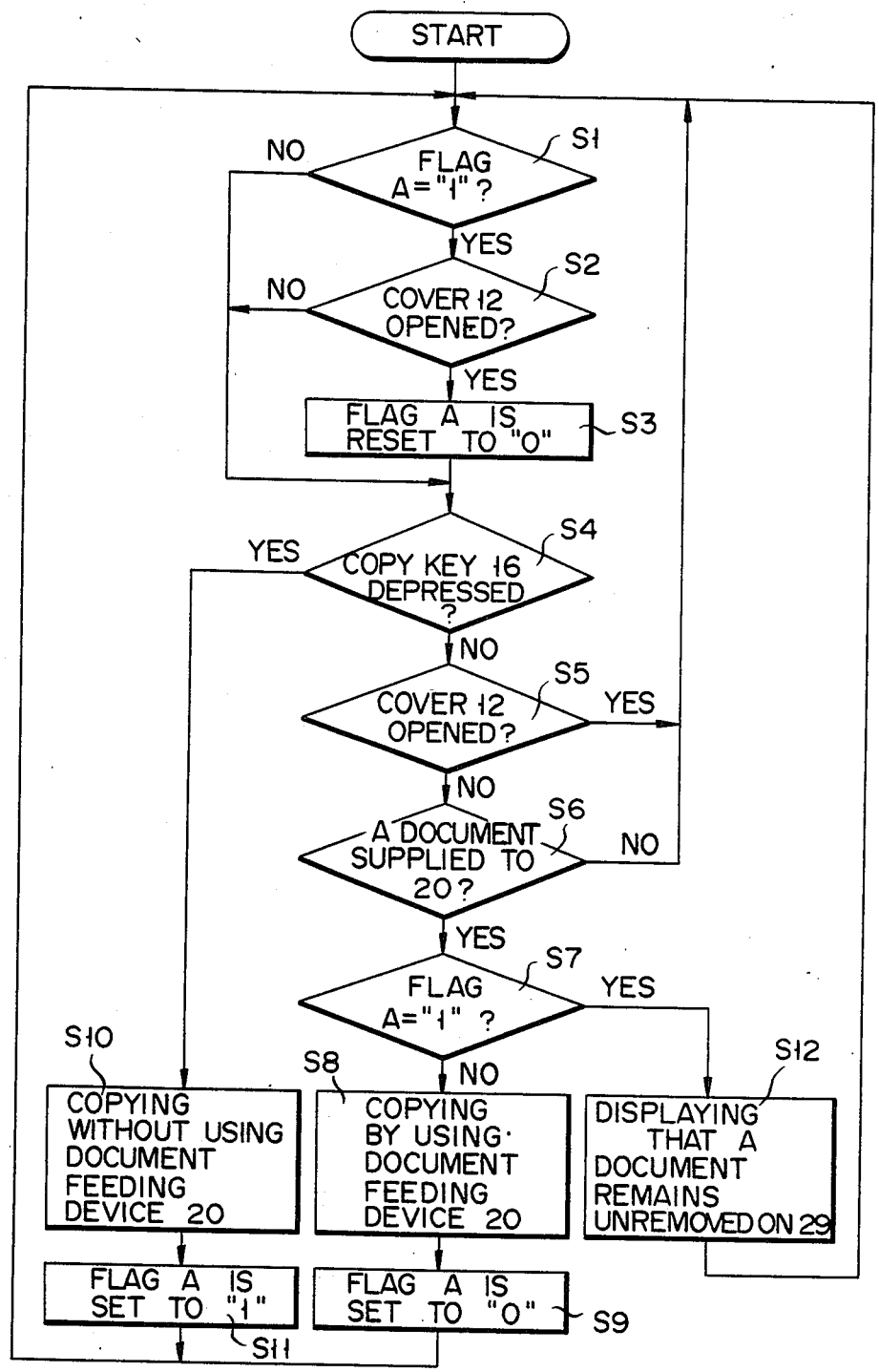
FIG. 5 is a flow chart showing the operation of the copying apparatus of this invention.

A description may now be made with reference to the flow chart of FIG. 5 of a copying apparatus embodying this invention which is arranged as described above. Now let it be assumed that the latest copying operation represents the second mode operation (the copying operation for a manually set document). The manually set document is removed from the document-supporting plate 29 after the completion of the second mode operation, and further the first or second mode operation ensues.

At Step S1 after the start of the copying apparatus, judgment is made to determine whether the A flag represents binary code 1. In the above-mentioned example, the preceding operation denotes the second mode operation (the copying operation for a manually set document). Therefore the A flag is set at binary code 1. At Step S2, judgment is made to determine whether the cover 12 is open. Since, in this case, the manually set document is removed, the cover 12 is of course opened (YES). Therefore, at Step S3 the A flag is reset at binary code 0. At Step S4, judgment is made to determine whether the copy key 16₁ was pushed. If it is found that the copy key 16₁ was not pushed (NO), judgment is made to determine whether the cover 12 was opened. If it is found that the cover 12 was opened (YES), control takes place at Step S1. If it is found that the cover 12 was closed (NO), judgment is made at Step S6 to determine whether a document was supplied to the document-feeding device 20. If it is found that the document was not supplied (NO), the operation returns to Step S1. If it is found that the document was supplied (YES), judgment is made at Step S7 to determine whether the A flag represents a binary code 1. In the foregoing example, the cover 12 was opened to take off a manually set document. Therefore, the A flag is reset at binary code 0 (NO). At Step S8, therefore, the first mode operation takes place to copy an automatically set document. At Step S9, therefore, the A flag is set at binary code 0. At this time the copying operation returns to Step S1. When the copy key 161 is pushed at Step S4 (YES), the second mode operation is carried out to copy a manually set document at Step S10. After the completion of the second mode operation, the A flag is set at binary code 1, and the copying operation returns to Step S1.

Now let it be assumed that the latest copying operation represents the second mode operation (copying operation for a manually set document), and the first mode operation for copying a document automatically set by means of the document-feeding device 20 after the second mode operation without taking off the manually set document is conducted. In the above-mentioned case, since the preceding copying operation represents the second mode operation, at Step S1, the A flag is set at binary code 1 (YES). Therefore, the copying operation can proceed to Step S2. At Step S2, the cover 12 remains closed (NO), because the manually set document has not been removed. Consequently, the copying operation jumps from Step S2 to Step S4. Since the document automatically set by the feeding device 20 is intended to be copied by the first mode operation, the copy key 16₁ is not pushed (NO) at Step S4. At Step S5, the cover 12 remains closed (NO). At Step S6, judgment is made to determine whether, under the above-mentioned conditions, a document was supplied to the document-feeding device 20. If it is found that this is the case (YES), the copying operation is shifted from Step S6, to Step S7. At Step S7, judgment is made to determine whether the A flag represents a binary code 1. In this case, the A flag is still set at 1 (YES) without being reset at 0, because the cover is not opened (NO) at Step S2 after the completion of the second mode operation. Therefore, the operation is prevented from advancing to Step S8 at which the first mode operation takes place to copy a document automatically supplied by the document-feeding device 20. At Step S12, the display section 16₂ indicates that the manually set document still remains on the document-supporting plate 29, thereby indicating that the copying operation can not be advanced to the first mode operation. After this information has been displayed in the display section 16₂, the copying operation returns to Step S1.

The switch 49 shown in FIG. 4 is generally used to determine whether the cover 12 is opened or closed. With the copying apparatus embodying this invention, the switch 49 can be applied to detect the position of the document-feeding device 20.

A description has been given of a copying apparatus embodying this invention. However, it should be noted that this invention is applicable to any type of image-forming apparatus which comprises a first mechanism where a document whose image is to be formed or whose information is to be read out is set manually at a predetermined position, and a second mechanism where a document whose image is to be formed or whose information is to be read out is set automatically at the predetermined position by a document-feeding device.

What is claimed is:

1. An image-forming apparatus fitted with a document-feeding device comprising:
   document-supporting means for holding at a prescribed spot thereon a document bearing an image to be formed on a recording medium;
   a document-feeding device for automatically feeding a document to said prescribed spot in cooperation with said document-supporting means, said document-feeding device being capable of being shifted between a first position in which said document-supporting means cooperates with said document-feeding device and a second position in which said document-supporting means does not cooperate with said document-feeding device;
   driving means for driving said apparatus in a first mode in which the image of a document automatically fed to said prescribed spot is formed on a recording medium and in a second mode in which the image of a document manually set at said prescribed spot is formed on said recording medium; and
   controller means which is coupled to said document-feeding device and said driving means, wherein
   said controller means includes a flag memory and prohibition means, said flag memory storing (a) first data denoting that an image forming operation was carried out in said second mode in an immediately previous image forming process, and (b) second data denoting that said document-feeding device has been shifted from said first position to said second position before the operation of said first mode is carried out, said prohibition means preventing the operation of said first mode immediately succeeding an image-forming operation carried out in said second mode until said flag memory is stored with said second data.

2. An image-forming apparatus fitted with a document-feeding device according to claim 1, further including display means for indicating, before the image-forming operation in said first mode, that said manually set document is still retained at the prescribed spot on said document-supporting means.

3. Apparatus for preventing damage to a manually-positioned document in a copying machine having automatic document-feeding means, comprising:

document-support means for supporting manually-positioned and automatically-fed documents at a copying position;

document feed means for feeding said automatically-fed documents to said copying position, said feed means being movable between a first position where it is adjacent said document-support means, and a second position where it is not adjacent said document-support means; and control means for preventing said document feed means from providing an automatically-fed document to said copying position until said document feed means has been moved to said second position after a manually-positioned document has been copied.

4. Apparatus according to claim 3 wherein said control means includes a position indicator for indicating the position of said document feed means.

5. Apparatus according to claim 4 wherein said control means includes a controller for controlling said document feed means, said controller having a flag memory storing a first signal when an immediately previous copying operation was conducted on a manually positioned document, and a second signal when an immediately previous copying operation was conducted on an automatically-fed document, said controller preventing said document feed means from feeding automatically-fed documents to said copying position when said first signal is stored in said flag memory.

6. Apparatus according to claim 5 further including display means for providing a display when said first signal is stored in said flag memory and when said position indicator indicates said document feed means is in said first position.

* * * * *